United States Patent [19]

O'Connor

[11] Patent Number: 4,598,445
[45] Date of Patent: Jul. 8, 1986

[54] TWO COMPONENT CARTRIDGE CASE AND METHOD OF ASSEMBLY

[75] Inventor: Donald E. O'Connor, Edisto Island, S.C.

[73] Assignee: Johnel M. O'Connor, Edisto Island, S.C.

[21] Appl. No.: 688,311

[22] Filed: Jan. 2, 1985

[51] Int. Cl.$^4$ .............................................. B21D 51/54
[52] U.S. Cl. ......................................... 29/1.3; 29/1.31
[58] Field of Search ................................ 29/1.2–1.23, 29/1.3–1.32; 102/507, 517

[56] References Cited

U.S. PATENT DOCUMENTS

| 1,861,054 | 5/1932 | Hadfield et al. | 102/517 |
| 3,498,221 | 3/1970 | Hilton et al. | 29/1.3 |
| 3,547,036 | 12/1970 | Brothers | 102/517 |
| 4,237,787 | 12/1980 | Wacula | 102/517 |
| 4,498,396 | 2/1985 | Berube | 102/517 |

Primary Examiner—Howard N. Goldberg
Assistant Examiner—Steven Nichols

[57] ABSTRACT

A two component cartridge case which may be of dissimilar materials including a tubular casing component with a mouth for receiving a projectile and reduced diameter shank with male threads to be received by the base component with corresponding female threads, recessed pocket on its centerline for holding a primer and a flange for engaging a firearm extraction mechanism.

The components, both tubular casing and base, are carefully proportioned to allow only a minimum of the base to enter a sizing die during sizing operations thus permitting ease of sizing using conventional (ordinary) sizing dies, while using a hard material in the base component for added strength.

The components are shaped to permit manufacture of the tubular casing component from existing conventional cartridge cases or from specially headed two diameter cartridge cases.

3 Claims, 14 Drawing Figures

TWO COMPONENT CARTRIDGE CASE AND METHOD OF ASSEMBLY

BACKGROUND AND BRIEF DESCRIPTION OF THE INVENTION

This invention relates to cartridge cases, and more particularly to composite cartridge cases made up of two components, including a tubular casing component having a mouth portion for receiving a projectile, and a separate base component for mounting a primer and providing a rim for extraction. The principle purpose of the two component parts is to permit the use of dissimilar materials for the components, usually comprising a softer and more ductile material such as brass for the tubular casing component and a harder high strength material such as steel for the base component.

Examples of such composite cases are described and claimed, for example, by U.S. Pat. No. 3,099,958 issued Aug. 6, 1963 to B. K. Daubenspeck, and U.S. Pat. No. 3,977,326 issued Aug. 31, 1976 to Ramond Anderson, and John J. Scanlon.

The general objectives of the present invention are to provide a re-usable two component case of great strength which can be easily disassembled by using a threaded joint to join the two components, and easily sized (reduced in size or formed to nominal cartridge dimensions) using conventional steel sizing dies. By using a softer material than the base for the tubular casing component and properly proportioning the two components so an excessive amount of the harder base does not enter the sizing die during sizing operations, conventional steel sizing dies can be utilized for sizing operations. By having a base component which is solid around the primer pocket, removing only that material needed to create an extraction groove, and using a high strength material such as steel, a cartridge case is created which is unusually resistant to deformation or failure from very high gas pressure in the critical base region.

Additionally, with the proper shape and proportions given in this invention, the forward section (tubular casing component) can be made from existing conventional cartridge cases. This tubular casing can also be made from cases which have been manufactured utilizing a slightly modified heading operation eliminating the need for reducing the diameter of the rear of the tubular casing prior to threading (male threads). Using existing conventional cartridge cases or cartridge cases modified only in the heading operation allows the use of existing cartridge case manufacturing facilities for production of the cartridge cases from which the tubular casings are manufactured.

DESCRIPTION OF THE DRAWINGS

While the specification concludes with claims pointing out the subject matter which is regarded as the invention, it is believed that a clearer understanding may be gained from the following descriptions referring to the accompanying drawings, in which:

DESCRIPTION AND MODE OF PRACTICE

Figure 1:
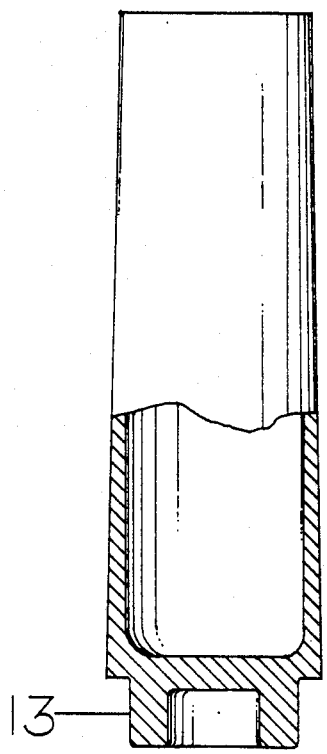
FIG. 1 shows a partial cross-sectional view showing a cartridge case modified in the heading operation specially for use in this invention, with a diameter reduction of the area to be threaded (13).
Figure 2:
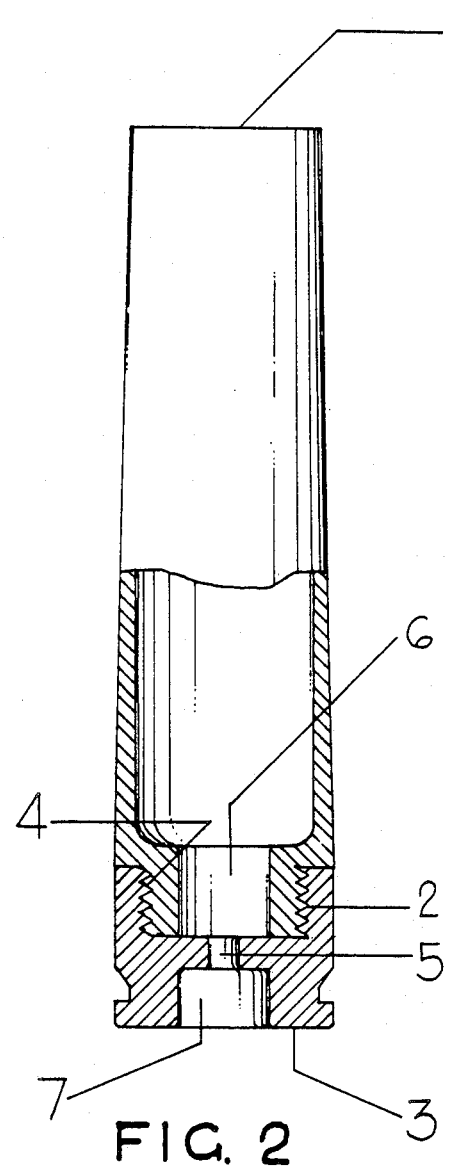
FIG. 2 is a partial cross sectional view showing the preferred formation of a tubular casing body and base screwed together in complete form.

FIG. 2 illustrates the preferred form of a tubular casing component and base component allowing for the possibility of using dissimilar materials for these parts. Steel or other high strength material could thus be used for the base component since the strength and temperature resistance requirements are at a maximum in the base component. The tubular casing component is a two diameter cylinder with a circular mouth (1) dimensioned to receive a projectile (not shown), terminating rearwardly in a reduced diameter cylindrical threaded shank (2) which is pierced (6) along its centerline axis for the passage of ignition gas from a primer (not shown) into the tubular casing component interior. The base component has female threads (4) to accept the threaded shank (2) of the tubular casing component, a flash hole (5) and a pocket (7) for a primer (not shown).

Figure 8:
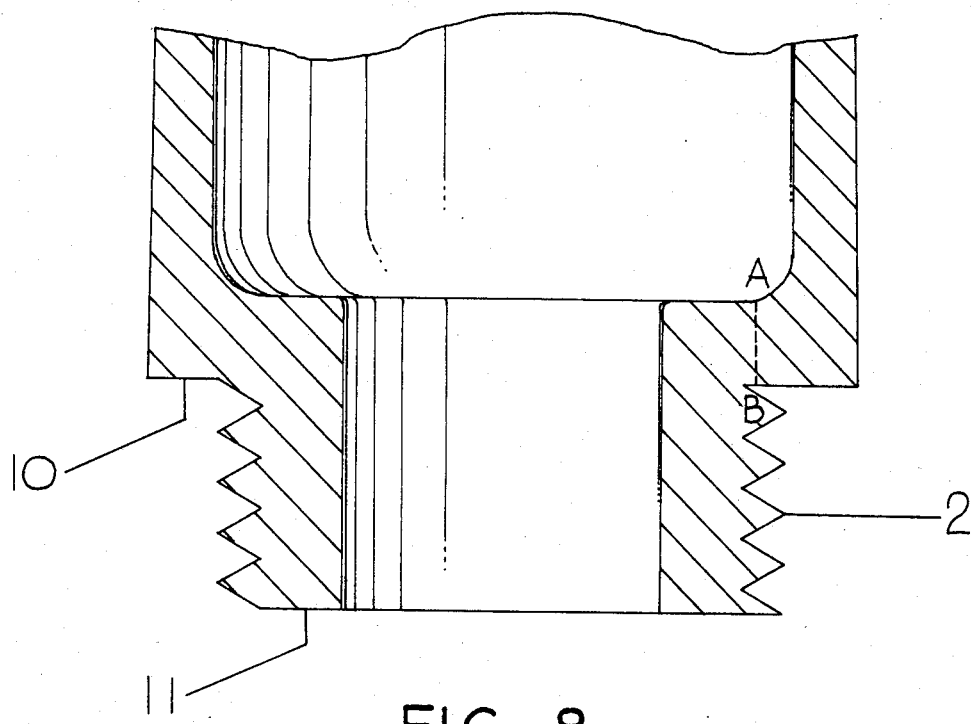
FIG. 8 shows a partial cross-sectional view of the threaded end of a tubular casing component.
Figure 9:
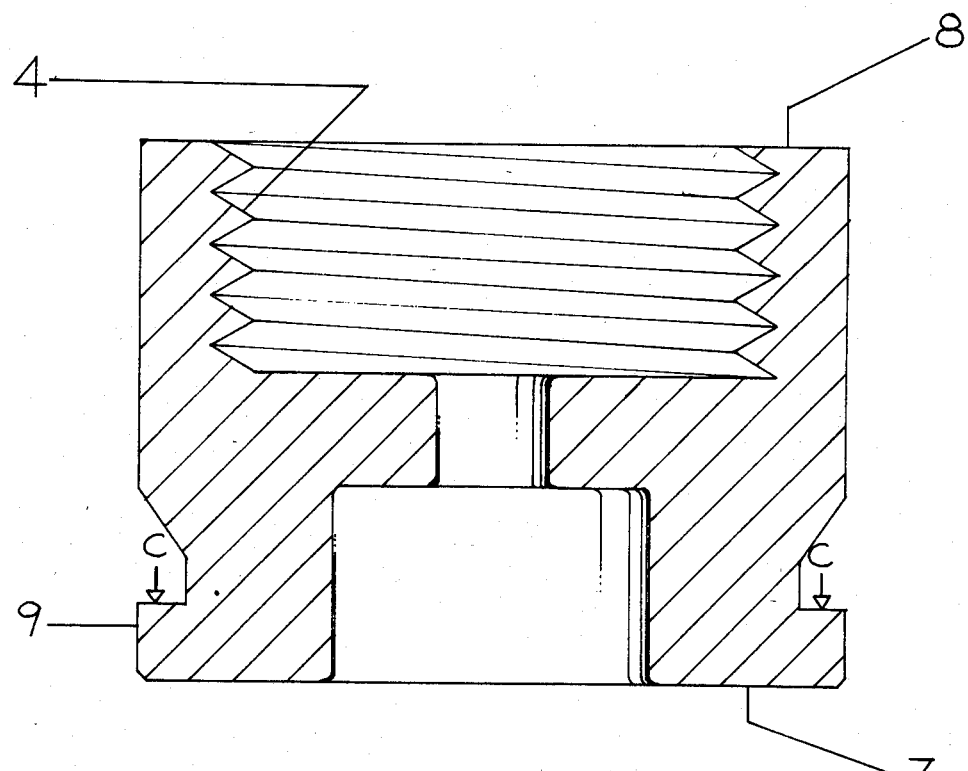
FIG. 9 shows a cross-sectional view of the preferred formation of the base component.
Figure 10:
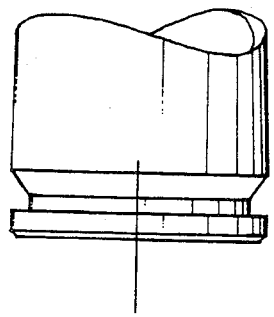
FIG. 10 shows a partial elevation view of a variation of case head (base component) configuration to which this invention can be applied called rimless.
Figure 11:
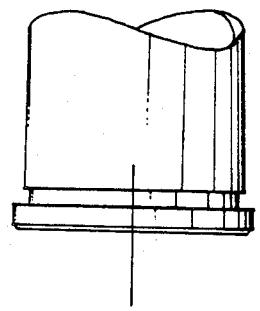
FIG. 11 shows a partial elevation view of a variation of case head (base component) configuration to which this invention can be applied called semi-rimmed.
Figure 12:
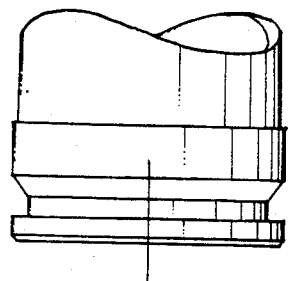
FIG. 12 shows a partial elevation view of a variation of case head (base component) configuration to which this invention can be applied called belted rimless.
Figure 13:
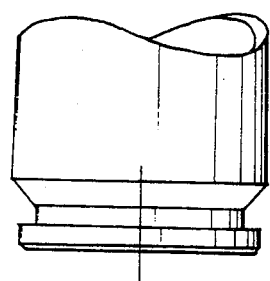
FIG. 13 shows a partial elevation view of a variation of case head (base component) configuration to which this invention can be applied called rebated rimless.

FIG. 8 and FIG. 9 show the length of the threads male (2) and female (4) are short enough to allow retention of sufficient material to prevent shear along line A-B (dashed) when a pull is exerted on the extractor rim (9) of the base component, in the direction of the arrows (C) when the two components are screwed together and acting as a single unit, and long enough to develop the full tensile strength of the tubular casing component forward of the threads. The length of the threaded shank of the tubular casing component from bottom

(11) to shoulder (10) is between 35% and 65% of the height of the base component from bottom (3) to shoulder (8).

This length is short enough to permit sizing operations to be performed in conventional sizing dies. The outside diameter of the threads (2) of the tubular casing component is greater than 70% of the diameter of the base component at the shoulder (8).

Figure 3:
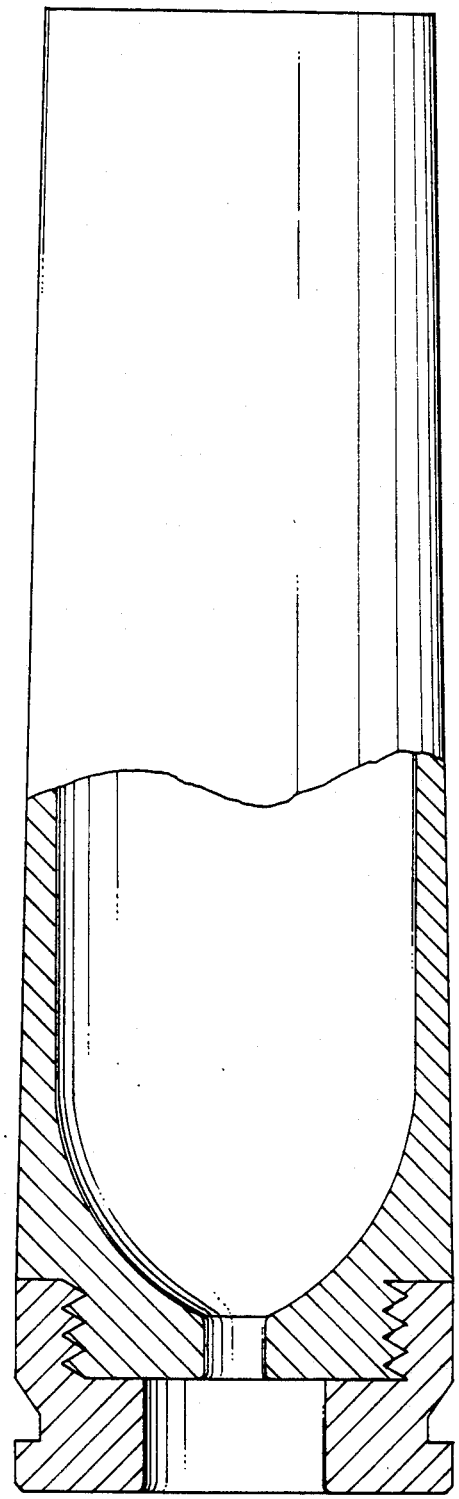
FIG. 3 is a partial cross sectional view showing another formation of a tubular casing body and base screwed together in complete form providing for greater internal volume.
Figure 4:
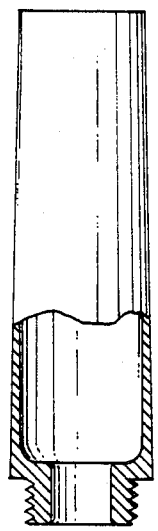
FIG. 4 and FIG. 5 show partial cross-sectional views of completed tubular casing components made from conventional cartridge cases (such as shown in FIG. 6 and FIG. 7) by reducing the diameter of a portion of the cartridge case head and installing male threads.
Figure 5:
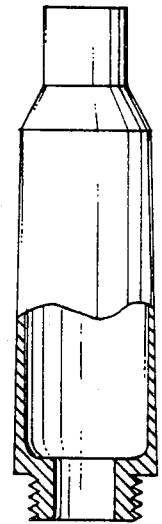
Figure 6:
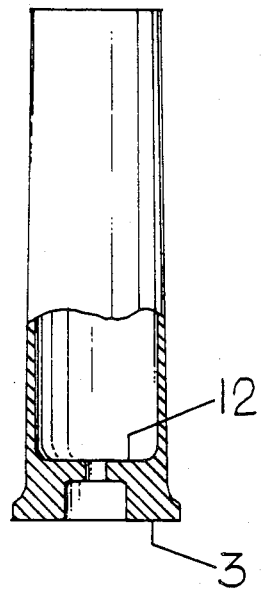
FIG. 6 shows a partial cross-sectional view of an unfinished conventional cartridge case at a stage of completion which would allow its use in making the tubular casing component described in this invention. This illustration is of a case during an intermediate phase of construction, after the heading operation and before cutting the extractor groove and shaping the extractor rim.
Figure 7:
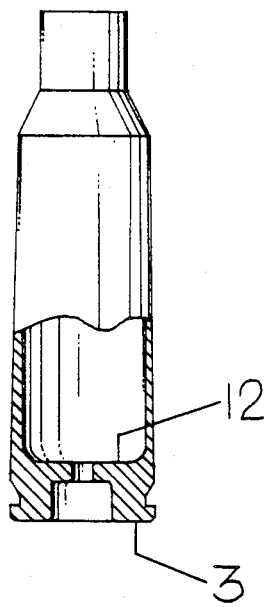
FIG. 7 shows a partial cross-sectional view of a completed conventional cartridge case of a type which can be used to make the tubular casing component described in this invention.

The length of the threaded shank of the tubular casing component from bottom (11) to shoulder (10) is less than the dimension from the base (3) (FIG. 6 and FIG. 7) to the top of the web (12) (FIG. 6 and FIG. 7) of a conventional cartridge case from which it can be made. The length of the base (FIG. 9) from bottom (3) to shoulder (1) in this invention is less than the diameter of the base at the shoulder (9). FIG. 3 illustrates a form of a tubular casing component and base component providing greater internal volume than the form shown in FIG. 2.

Figure 14:
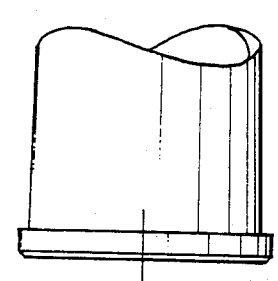
FIG. 14 shows a partial elevation view of a variation of case head (base component) configuration to which this invention can be applied called rimmed.

FIG. 10, FIG. 11, FIG. 12, FIG. 13, FIG. 14 illustrate elevations of several case head forms to which the invention can be easily applied. Rimless case (shown in FIGS. 2, 3, 7, 9 and 10), a semi-rimmed case (FIG. 11), belted rimless case (FIG. 12), rebated rimless case (FIG. 13) and rimmed case (FIG. 14).

What is claimed is:

1. A method of forming a two component cartridge case which comprises the steps of:

forming a tubular casing body with a mouth portion at the forward end thereof for receiving a selected projectile in gas-sealing mechanically secured relation therein, and with an open-ended breech portion in the form of a cylinder of a smaller diameter than the forward end and threaded with male threads leaving a shoulder at the juncture of the tubular casing body with the smaller diameter threaded cylinder, said threaded cylinder to have a length from said shoulder to the rear or breech end of said tubular casing body between 35% and 65% of the height of the base component and a diameter greater than 70% of the diameter of the base component, with said base component formed of a harder and stronger material than the tubular casing component, with female threads at the forward end thereof of a depth and diameter corresponding to the male threads of the tubular casing component and the outside diameter of the base component at its forward end greater than the length of the base component from its forward end to its breech end.

2. The method of forming the forward component of a two-component cartridge case which comprises the steps of:

forming a tubular casing body from a conventional one-piece cartridge case having a mouth portion at the forward end thereof and reducing the diameter of the base area of said conventional one-piece cartridge case thereby forming a shoulder at the juncture of the forward end with the reduced diameter base end, said reduced diameter area having a length from breech end to said shoulder less than the length from the breech end to the top of the web of said conventional one-piece cartridge case from which the tubular casing body is made; then threading the reduced diameter area with male threads.

3. The method of forming a one-piece cartridge case of special shape for forming the forward component of a two-component cartridge case which comprises the steps of:

altering the shape of the breech end of a conventional one-piece cartridge case during the heading of said breech end to provide a cylindrical shank of reduced diameter and a shoulder at the juncture of the forward end of said conventional one-piece cartridge case and the reduced diameter cylindrical shank.

* * * * *